(12) United States Patent
Trainin et al.

(10) Patent No.: US 9,647,804 B2
(45) Date of Patent: May 9, 2017

(54) MULTI-CARRIER CONFIGURATION, ACTIVATION AND SCHEDULING

(71) Applicant: Intel Corporation, Santa Clara, CA (US)

(72) Inventors: Solomon Trainin, Haifa (IL); Robert Stacey, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/553,883

(22) Filed: Nov. 25, 2014

(65) Prior Publication Data

US 2015/0078366 A1    Mar. 19, 2015

Related U.S. Application Data

(63) Continuation of application No. 13/110,858, filed on May 18, 2011, now Pat. No. 8,898,532, which is a
(Continued)

(51) Int. Cl.
*H04L 1/18* (2006.01)
*H04L 1/16* (2006.01)
*H04W 84/12* (2009.01)

(52) U.S. Cl.
CPC ......... *H04L 1/1896* (2013.01); *H04L 1/1621* (2013.01); *H04L 1/1685* (2013.01); *H04W 84/12* (2013.01)

(58) Field of Classification Search
CPC .... H04L 1/1685; H04L 1/1621; H04L 1/1896
See application file for complete search history.

(56) References Cited

U.S. PATENT DOCUMENTS 4,551,834 A * 11/1985 Lienard .................. 370/394
4,590,468 A *  5/1986 Stieglitz ................. 370/450
(Continued)

FOREIGN PATENT DOCUMENTS

CN        1365553 A     8/2002
CN      101208895 A     6/2008
(Continued)

OTHER PUBLICATIONS

"IEEE Standard for Information Technology—Telecommunications and Information Exchange Between Systems—LAN/MAN Specific Requirements—Part 11 Wireless Medium Access Control (MAC) and Physical Layer (PHY) specifications Amendment: Medium Access Control (MAC) Quality of Service (QoS) Enhancements," IEEE Std P802.11e/D13.0, Jan. 2005.*
(Continued)

*Primary Examiner* — Joseph D Torres
(74) *Attorney, Agent, or Firm* — Thorpe North & Western

(57) ABSTRACT

Embodiments of block acknowledgements request apparatus, systems, and methods are generally described herein. Other embodiments may be described and claimed. An aggregated block of a plurality of data frames is received from an originator transmission, with each data frame including a medium access control (MAC) header. An acknowledgement policy that is solicited by the originator is identified in a quality of service field in at least one of the MAC headers of the received transmission. A single block acknowledgement is transmitted to the originator acknowledging receipt of one or more of the plurality of data frames in the aggregated block of data frames.

2 Claims, 4 Drawing Sheets

| ACK POLICY IN QoS CONTROL FIELD || MEANING |
| BIT 5 | BIT 6 | |
|---|---|---|
| 0 | 0 | NORMAL ACKNOWLEDGMENT IN NON-AGGREGATE TRANSMISSION, BLOCK ACK REQUEST IN AGGREGATE TRANSMISSION. THE ADDRESSED RECIPIENT RETURNS ACK IF THE FRAME WAS RECEIVED IN A NON-AGGREGATE TRANSMISSION OR BLOCK ACK IF THE FRAME WAS RECEIVED IN AN AGGREGATE TRANSMISSION. [MEANING CHANGED] |
| 0 | 1 | NO ACKNOWLEDGMENT. [MEANING UNCHANGED] |
| 1 | 0 | NO EXPLICIT ACKNOWLEDGMENT. [MEANING UNCHANGED] |
| 1 | 1 | BLOCK ACKNOWLEDGMENT. THE ADDRESSED RECIPIENT TAKES NO ACTION ON RECEIVING THE FRAME EXCEPT FOR RECORDING THE STATE. [MEANING UNCHANGED] |

Related U.S. Application Data continuation of application No. 11/167,491, filed on Jun. 27, 2005, now abandoned.

(56) References Cited

U.S. PATENT DOCUMENTS

| | | | | |
|---|---|---|---|---|
| 4,766,536 | A | * | 8/1988 | Wilson et al. .............. 710/121 |
| 4,858,112 | A | * | 8/1989 | Puerzer et al. ............. 709/230 |
| 4,970,714 | A | * | 11/1990 | Chen et al. ................ 370/216 |
| 5,406,557 | A | * | 4/1995 | Baudoin ..................... 370/407 |
| 5,440,545 | A | * | 8/1995 | Buchholz ............ H04L 1/1614 370/426 |
| 5,592,468 | A | * | 1/1997 | Sato ........................... 370/252 |
| 6,295,585 | B1 | * | 9/2001 | Gillett et al. .............. 711/148 |
| 6,643,813 | B1 | | 11/2003 | Johansson et al. |
| 6,754,170 | B1 | | 6/2004 | Ward |
| 7,164,676 | B1 | * | 1/2007 | Chakraborty ....... G06F 17/3038 370/368 |
| 7,290,195 | B2 | * | 10/2007 | Guo et al. ................... 714/749 |
| 7,385,976 | B2 | * | 6/2008 | Gu et al. ..................... 370/389 |
| 7,480,509 | B2 | * | 1/2009 | Kang et al. ................. 455/442 |
| 7,567,537 | B1 | * | 7/2009 | Gurbuz et al. ............. 370/338 |
| 8,898,532 | B2 | | 11/2014 | Trainin et al. |
| 2002/0089927 | A1 | * | 7/2002 | Fischer et al. .............. 370/229 |
| 2002/0089959 | A1 | * | 7/2002 | Fischer et al. .............. 370/338 |
| 2002/0089994 | A1 | * | 7/2002 | Leach et al. ................ 370/412 |
| 2003/0231650 | A1 | * | 12/2003 | Shoemake et al. .......... 370/464 |
| 2004/0143676 | A1 | | 7/2004 | Baudry et al. |
| 2004/0153706 | A1 | | 8/2004 | Cayla |
| 2005/0157715 | A1 | * | 7/2005 | Hiddink et al. ............ 370/389 |
| 2006/0153152 | A1 | * | 7/2006 | Kondylis et al. ............ 370/338 |
| 2006/0182071 | A1 | * | 8/2006 | Soomro ....................... 370/338 |
| 2007/0011554 | A1 | | 1/2007 | Trianin |
| 2011/0216752 | A1 | | 9/2011 | Trainin et al. |

FOREIGN PATENT DOCUMENTS

| | | |
|---|---|---|
| DE | 112006001510 T5 | 8/2008 |
| GB | 2441279 A | 2/2008 |
| WO | WO 00/49761 A1 | 8/2000 |
| WO | WO 2007/002630 A1 | 1/2007 |

OTHER PUBLICATIONS

Chen et al.; Adaptive Diy-ACK for TCP over 802.15.3 WPAN; Global Telecommunications Conference (GLOBECOM04); Nov. 29-Dec. 3, 2004, pp. 1686-1690; vol. 3.
PCT Application PCT/US2006/024894; filing date Jun. 27, 2006; Intel Corporation; International Search Report mailed Oct. 6, 2006.
PCT Application PCT/US2006/024894; filing date Jun. 27, 2006; Intel Corporation; International Preliminary Report on Patentability mailed Jan. 17, 2008.
Chinese patent application 201210182570.8; filing date Jun. 27, 2006; Intel Corporation; office action mailed May 14, 2014.
Chinese patent application 201210182570.8; filing date Jun. 27, 2006; Intel Corporation; patent granted Dec. 4, 2014.
United Kingdom patent application GB0724743.0; filing date Jun. 27, 2005; Intel Corporation; office action mailed Mar. 23, 2009.
United Kingdom patent application GB0724743.0; filing date Jun. 27, 2005; Intel Corporation; patent issued Apr. 7, 2010.
Chinese patent application 200680023123.0; filing date Jun. 27, 2006; Intel Corporation; office action mailed Apr. 29, 2010.
Chinese patent application 200680023123.0; filing date Jun. 27, 2006; Intel Corporation; patent granted Mar. 27, 2012.

\* cited by examiner

| ACK POLICY IN QoS CONTROL FIELD | | MEANING |
|---|---|---|
| BIT 5 | BIT 6 | 302 |
| 303~ 0 | 304~ 0 | NORMAL ACKNOWLEDGMENT IN NON-AGGREGATE TRANSMISSION, BLOCK ACK REQUEST IN AGGREGATE TRANSMISSION. THE ADDRESSED RECIPIENT RETURNS ACK IF THE FRAME WAS RECEIVED IN A NON-AGGREGATE TRANSMISSION OR BLOCK ACK IF THE FRAME WAS RECEIVED IN AN AGGREGATE TRANSMISSION. [MEANING CHANGED] |
| 0 | 1 | NO ACKNOWLEDGMENT. [MEANING UNCHANGED] |
| 1 | 0 | NO EXPLICIT ACKNOWLEDGMENT. [MEANING UNCHANGED] |
| 1 | 1 | BLOCK ACKNOWLEDGMENT. THE ADDRESSED RECIPIENT TAKES NO ACTION ON RECEIVING THE FRAME EXCEPT FOR RECORDING THE STATE. [MEANING UNCHANGED] |

FIG. 3

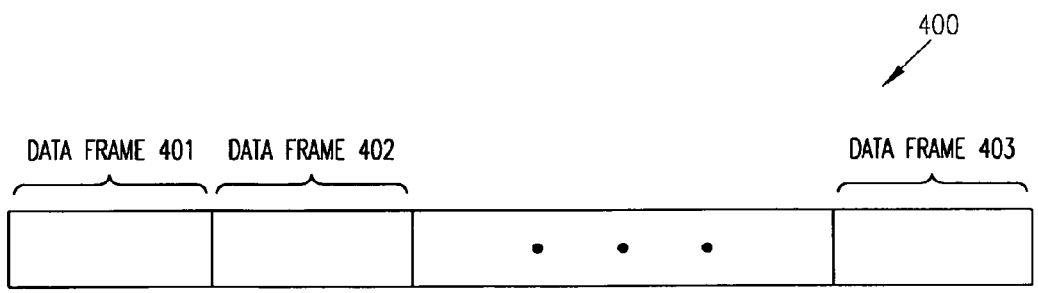

FIG. 4

MULTI-CARRIER CONFIGURATION, ACTIVATION AND SCHEDULING

CLAIM OF PRIORITY

This application is a continuation of U.S. patent application Ser. No. 13/110,858 filed on May 18, 2011, which is a continuation of U.S. patent application Ser. No. 11/167,491 filed on Jun. 27, 2005, each of which are incorporated herein by reference in their entirety.

BACKGROUND

The inventive subject matter pertains to communication systems and, more particularly, to wireless transmission and reception of data in a communication system.

In modern communication systems, data typically is sent in packet form from one communication node through a network to another communication node. These packets typically include one or more headers and a payload, which is the useful data to be sent, received and used by the communication nodes. Such data transmissions in a Media Access Control (MAC) protocol may take place at a relatively low transmission rate.

During transmit and receive operations, handshaking occurs to acknowledge the proper receipt of transmitted data. An acknowledgement is typically requested by a transmitting node after sending a block of data. If errors occur, an error acknowledgement is returned to the transmitting node, and the data is transmitted.

Often the acknowledgement request must be repeated. The acknowledgement request may be repeated in subsequent physical layer protocols, thereby further lowering the overall transmission rate.

DESCRIPTION OF THE DRAWINGS

FIG. 3 is a table layout of an indicator of the media access control protocol header depicting various embodiments of the present invention.

FIG. 4 is a layout of a multiple-frame data block in accordance with various embodiments of the present invention.

DETAILED DESCRIPTION

Figure 1:
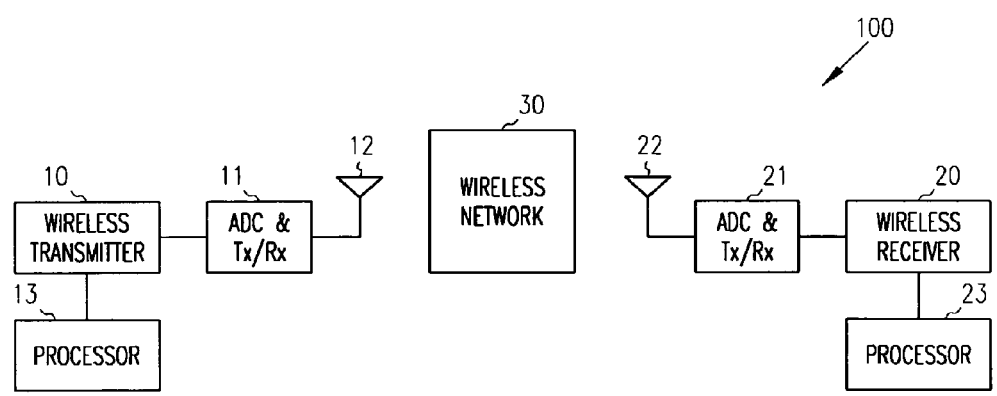
FIG. 1 is a block diagram of a communication system in accordance with various embodiments of the present invention.

FIG. 1 is a block diagram of a communication system 100 in accordance with various embodiments of the present invention. The communication system 100 has a wireless transmitter 10. The wireless transmitter 10 is coupled to an analog-to-digital/digital-to-analog converter (ADC) and a transmitter/receiver (Tx/Rx) 11. The ADC & Tx/Rx 11 converts signals from digital to analog in the transmit direction and from analog to digital in the receive direction of wireless transmitter 10. Wireless transmitter 10 is also coupled to a processor 13. Processor 13 controls operation of transmitter 10.

ADC & Tx/Rx 11 is coupled to an antenna 12. Antenna 12 may be a directional or omni-directional antenna, including, for example and not by way of limitation, a dipole antenna, a monopole antenna, a patch antenna, a loop antenna, a microstrip antenna, or various other types of antennas suitable for transmission and/or reception of data signals. In some embodiments, the wireless transmitter may have multiple antennas.

The communication system 100 also has a wireless receiver 20. Wireless receiver 20 is coupled to an analog-to-digital/digital-to-analog converter (ADC) and transmitter/receiver (Tx/Rx) 21. ADC & Tx/Rx 21 converts signals from digital to analog in the transmit direction and from analog to digital in the receive direction of wireless receiver 20. Wireless receiver 20 is also coupled to processor 23. Processor 23 controls operation of receiver 20.

ADC & Tx/Rx 21 is coupled to an antenna 22. Antenna 22 may be a directional or omni-directional antenna, including, for example and not by way of limitation, a dipole antenna, a monopole antenna, a patch antenna, a loop antenna, a microstrip antenna, or various other types of antennas suitable for transmission and/or reception of data signals. In some embodiments, the wireless receiver 20 may have multiple antennas.

Wireless network 30 couples the transmitter 10 to the receiver 20 for the transfer of data. The roles of the transmitter 10 and the receiver 20 may be reversed, in that the transmitter 10 may receive and the receiver 20 may transmit data. Wireless network 30 may be a single wireless network in one embodiment, or in other embodiments wireless network 30 may be any combination of wireless and wireline networks. Wireless network 30 may in other embodiments comprise a wireless local area network (WLAN), wireless personal area network (WPAN) and/or wireless metropolitan area network (WMAN).

Communication system 100 of FIG. 1 may be one in which the Standards of the Institute of Electrical and Electronic Engineering (IEEE), Standards 802.11, published in 1998 together with subsequent amendments apply. The IEEE 802.11 Standard currently provides a definition for media access control (MAC) headers and services. In 2003, an IEEE 802.11 Task Group n (TGn) was created. TGn's objective is to define modifications to the Physical Layer (PHY) and MAC layer to deliver a throughput of at least 100 megabits per second. The IEEE 802.11n Standards are currently at the proposal stage. Several proposals exist. A further objective of the 802.11n Standards is to be downward-compatible with Standards 802.11a/b/g.

Previous standards, such as the draft IEEE 802.11e standard, call for a handshaking arrangement between transmitter and receiver. In this arrangement, a block of data frames is sent, but each individual data frame is sent as a separate transmission. Each data frame has its acknowledge (ack) policy set to "1, 1," indicating block acknowledgement (BA). Next, the originator sends a separate block acknowledgement request (BAR) frame to solicit a BA response. The recipient then, in turn, responds with a (BA) frame.

The transmitter may also choose to solicit a normal acknowledgement for an individual data frame. This is achieved by setting the ack policy on an individual data frame to "0, 0" which will cause the recipient to respond with a normal ack (acknowledge) frame.

With the high data rate desired for IEEE Standard 802.11n, scope exists for improving the efficiency of this exchange. One key enhancement is the aggregation of multiple data frames into a single transmission. When doing this, the conventional acknowledgement mechanism described may be modified to improve efficiency further.

In an embodiment of the invention, wireless transmitter may perform non-aggregate or aggregate transmissions. In an aggregate transmission, wireless transmitter 10 aggregates one or more data frames into a block that is then sent as a single transmission. An aggregate transmission is signaled either implicitly by the nature of the transmission or explicitly with a signaling field at the head of the transmission.

If a block acknowledgement is required for the aggregated data, then the wireless transmitter 10 will set the ack policy in each data frame in the aggregate transmission to "0, 0" (normal ack policy).

If the wireless transmitter 10 chooses to solicit the block acknowledgement using a conventional BAR frame (either in the same transmission or a subsequent transmission), then each data frame in the aggregate transmission will have its ack policy set or flag to "1, 1" (block ack policy).

The use of normal ack policy thus has a new meaning: when used in a data frame in a non-aggregate transmission, the normal ACK policy solicits an ACK frame from the recipient. When set in one or more data frames in an aggregate transmission, the normal ACK policy solicits a BA frame from the recipient The aggregate transmission is sent from transmitter 10, through ADC &Tx/Rx 11, through antenna 12, through wireless network 30, through antenna 22, through ADC &Tx/Rx 21 to wireless receiver 20.

Wireless receiver 20 receives the aggregate transmission, identifies it as an aggregate transmission and parses it to extract the individual data frames. One or more of the data frames may not be received due to transmission errors. If the ACK policy of one or more of the successfully received data frames is set to "0, 0" (normal acknowledgment), then receiver 20 sends a BA to transmitter 10. Otherwise, the conventional acknowledgement policy as defined in the current IEEE 802.11 Standard is followed.

Thus, a field in the header of the data frames making up an aggregate transmission is used to request a BA, rather than the transmitter 10 transmitting a separate BAR frame. The BAR may still be used, as needed, for sequence number synchronization and for flushing a reorder buffer when data frames are discarded by the transmitter 10. Soliciting a BA using a field in the header of each data frame, making up an aggregated may improve reliability over sending a separate BAR frame, especially if that BAR frame is aggregate with the data in the same transmission, since the solicitation is repeated in each data frame. Elimination of the BAR may also remove ambiguity when no BA response is received. No BA response will be received if either none of the data frames were received or the response transmission was not detected by the originator. Because the latter is far less likely (signal detection is far more robust than demodulation), full retransmit can be done immediately rather than resending a BAR, receiving a BA, and then retransmitting the full aggregated block.

When the BA is received by the transmitter 10, the identity of properly received frames is included in the BA. If any errors occur, only frames of the block that were not acknowledged are re-transmitted by transmitter 10. If the block acknowledgement is not received by transmitter 10, then all frames of the multiple-frame block require re-transmission.

Figure 2:
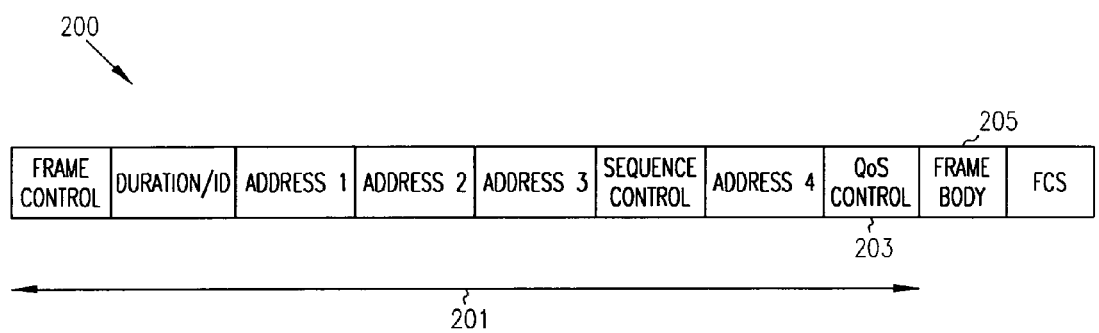
FIG. 2 is a layout of a media access control protocol header depicting various embodiments for implementing a block acknowledgement request.

FIG. 2 is a layout 200 of a media access control protocol header 201 depicting various embodiments for implementing a BAR. The media access control (MAC) header 201 is concatenated with the frame body 205. In an embodiment, the frame body 205 may include from zero to several thousand octets of data. An octet is 8 bits or a byte.

The BA solicitation is signaled in the Quality of Service (QoS) Control field 203. For example, the QoS Control field 203 is may be two octets in length. The specific settings for the BA solicitation will be explained infra.

FIG. 3 is a table layout 300 of ack policy field in the QoS Control field of the media access control protocol header depicting various embodiments of the present invention. Bits 301 and 302 of the Ack (Acknowledge) Policy field 203 (refer to FIG. 2) indicate the policy for acknowledgement or other handshaking between the transmitter 10 (FIG. 1) and the receiver 20. Bits 301 and 302 are referred to as bits 5 and 6 for block acknowledgement modes.

Bits 5 and 6 for values of: 0, 1 indicate no BA requested; 1, 0 indicate no explicit BA requested; and 1, 1 indicate BA requested after each block.

When the values 303 and 304 of bits 301 and 302 respectively are 0, 0 as shown in FIG. 3, two meanings are possible for this configuration. The first meaning is to return a BA, if the frame was received in a non-aggregate transmission.

The second meaning 305 of the policy for handshaking indicates that if an aggregate transmission was received, a BA is to be returned to the originator immediately following the aggregate transmission.

So for various embodiments of the present invention, the second meaning 305 controls the handshaking policy in an aggregate, multiple-frame transmission. Therefore, only one BA is sent for the entire transmission of multiple frames of data. This BA is sent in response to the BA solicitation signaled in the header 201 (e.g. in the QoS Control field 203, FIG. 2) of each data frame. A separate BAR need not be sent following transmission of the block of frames. This may improve the transmission efficiency.

FIG. 4 is a layout of a multiple-frame data block in accordance with various embodiments of the present invention. A multiple-frame data block 400 may have N data frames generally shown as 401, 402, and 403. Although FIG. 4 depicts three data frames, the multiple-frame data block 400 may include additional or fewer data frames.

In an embodiment, bits 5 and 6 (301, 302 of FIG. 3) of the MAC header of each data frame are set to 0, 0. As a result, when the N data frames 401-403 are received by a receiver, only one BA is returned to the originator for the entire multiple-frame data block 400. Thereby considerable savings may be obtained over returning a BA to the originator after each data frame by the elimination of all BA messages and BARs, except the last one. In addition, no separate BAR needs to be sent by the originator following transmission of the multiple-frame data block 400, which may potentially improve the transmission efficiency.

Figure 5:
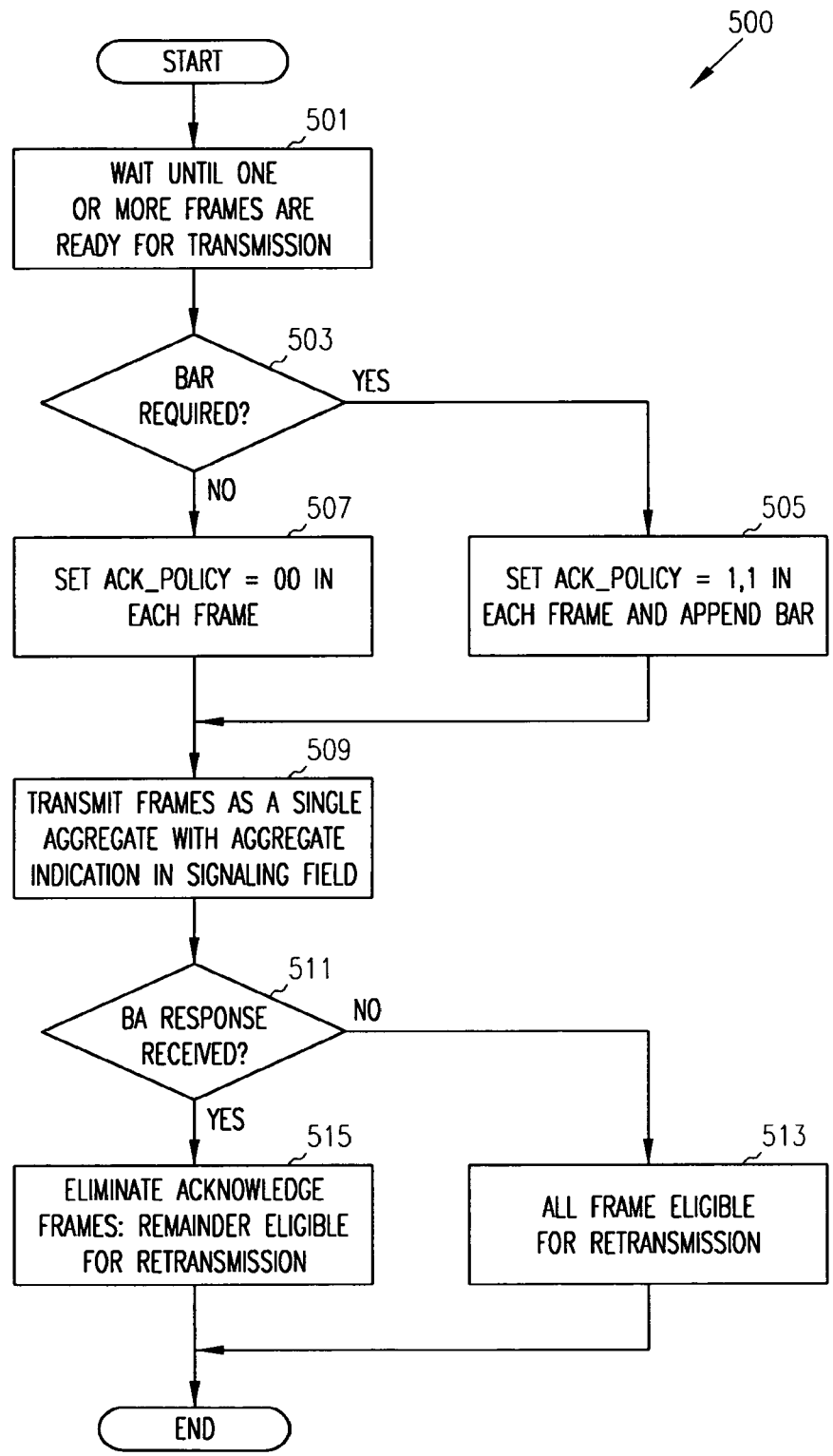
FIG. 5 is a flowchart of various transmission methods for block acknowledgement control in accordance with various embodiments of the present invention.

FIG. 5 is a flowchart of various transmission methods 500 for block acknowledgement control in accordance with various embodiments of the present invention. The transmit behavior flow may begin at block 501. Block 501 comprises waiting until one or more frames of data are ready for transmission by transmitter 10. Multiple frames are aggregated into a single multiple-frame data block for transmission. This data block 400 is shown in FIG. 4.

In block 503, a determination is made whether a block acknowledgement request (BAR) is required for the data transmission. If a traditional BAR is required (e.g. for sequence number synchronization), block 503 transfers control to block 505 via the YES path. In block 505, bits 5, 6 (301, 302) of the ACK policy are set to 1, 1 in each data frame, and a BAR is appended to the data frames for transmission. Control is transferred to block 509.

In various embodiments of the present invention, no BAR is required, and block 503 transfers control to block 507 via the NO path. Bits 5, 6 (301, 302) of the ACK policy are set to 0, 0 in each data frame. Control is then transferred to block 509.

Block 509 transmits the multiple frames of data as a single aggregate data block with the appropriate acknowledgement policy in each MAC header. Block 511 then waits for BA to be received. If a BA is not received, block 511 transfers control to block 513 via the NO path. Block 513 re-transmits all data frames to the receiver. Then the method is ended.

If the BA is received, as is typically the case, block 511 transfers control to block 515 via the YES path. Block 515 may then retransmit any data frames that the BA indicated were received with an error, while eliminating from retransmission any properly received data frames. The method is then ended.

Figure 6:
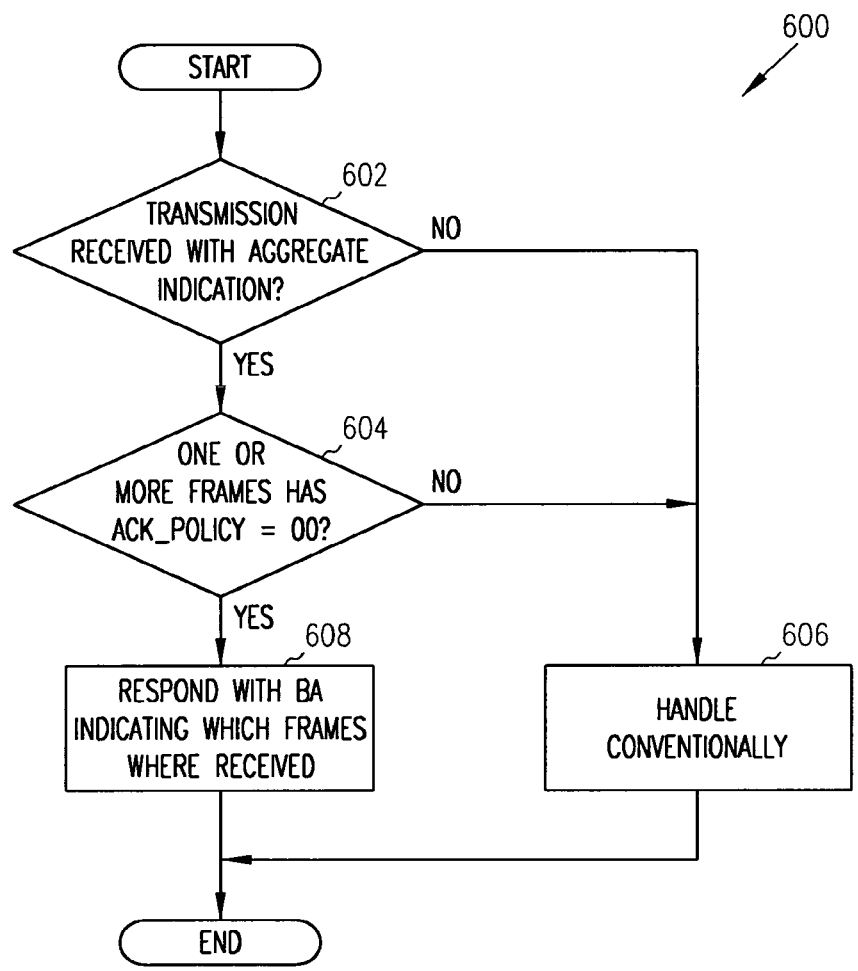
FIG. 6 is a flowchart of various reception methods for block acknowledgement control in accordance with various embodiments of the present invention.

FIG. 6 is a flowchart of various reception methods for block acknowledgement control in accordance with various embodiments 600 of the present invention. The receive behavior flow may begin at block 602. Block 602 determines whether a receiver (e.g. the receiver 20) received data frame transmission with aggregated frames of data from a transmitter (e.g. the transmitter 10). If not, the block 602 transfers control via the NO path to block 606. Block 606 handles the data reception and acknowledgement in a suitable, non-aggregate, conventional manner. The method is then ended.

If the receiver 20 received an aggregate transmission, block 602 transfers control to block 604 via the YES path. Block 604 then determines whether the data frames have been received with the ACK policy bits 5 and 6 set to 0, 0. If not, block 604 transfers control to block 606 via the NO path. Block 606 handles the data reception in a suitable, non-aggregate, conventional manner. The method is then ended.

If the ACK policy bit were set to 0, 0, block 604 transfers control to block 608 via the YES path. Block 608 prepares a single block acknowledgement, BA, for transmission to the transmitter 10. The BA may identify which data frames were received without error by the receiver 20. Then, the BA is transmitted to the transmitter 10. The method is then ended.

It should be noted that the methods described herein do not have to be executed in the order described, or in any particular order. Moreover, various activities described with respect to the methods identified herein can be executed in parallel fashion. It will be understood that although "Start" and "End" blocks are shown, the methods may be performed continuously.

The Abstract is provided to comply with 37 C.F.R. §1.72(b) requiring an Abstract that will allow the reader to ascertain the nature of the technical disclosure. It is submitted with the understanding that it will not be used to interpret or limit the scope or meaning of the claims.

In the foregoing Detailed Description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. Individual claims may encompass multiple embodiments of the inventive subject matter.

Although some embodiments of the invention have been illustrated, and those forms described in detail, it will be readily apparent to those skilled in the art that various modifications may be made therein without departing from the spirit of these embodiments or from the scope of the appended claims. Although some embodiments of the invention have been illustrated, and those forms described in detail, it will be readily apparent to those skilled in the art that various modifications may be made therein without departing from the spirit of these embodiments or from the scope of the appended claims.

What is claimed is:

1. A device for communicating in a wireless local area network the device comprising:
   a transmitter to modulate and transmit a first transmission having an aggregated block of data frames, each data frame having a respective medium access control (MAC) header, wherein the first transmission comprises a single transmission that includes a block acknowledgement request (BlockAckReq) policy embedded in a quality of service (QoS) field of the MAC header;
   a processor coupled to the transmitter to generate the first transmission by aggregating a plurality of data frames into a single multi-frame data block for transmission and to provide an acknowledgement policy for the multi-frame data block from an intended recipient, wherein the acknowledgement policy is provided in the QoS field as a BlockAck policy or a Normal acknowledgement policy in at least one of the MAC headers; and
   a receiver coupled to the processor to receive a single block acknowledgement (BlockAck) for the entire multi-frame data block from the intended recipient based on the solicited acknowledgement policy, wherein the single block acknowledgement identifies which of the plurality of data frames in the first transmission were received without error at the intended recipient,
   wherein the transmitter is further configured to retransmit data frames that were not acknowledged in the single block acknowledgement to the intended recipient, the data frames being retransmitted using a second single transmission of aggregated data frames,
   wherein the receiver and transmitter are configured to receive and transmit utilizing protocols in conformance with an Institute of Electrical and Electronics Engineers (IEEE) 802.11n standard.

2. The device of claim 1 wherein the transmitter includes multiple antennas.

* * * * *